US011869465B2

United States Patent
Maezawa et al.

(10) Patent No.: US 11,869,465 B2
(45) Date of Patent: Jan. 9, 2024

(54) MUSICAL PERFORMANCE ANALYSIS METHOD AND MUSICAL PERFORMANCE ANALYSIS APPARATUS

(71) Applicant: YAMAHA CORPORATION, Hamamatsu (JP)

(72) Inventors: Akira Maezawa, Hamamatsu (JP); Bochen Li, Rochester, NY (US)

(73) Assignee: YAMAHA CORPORATION, Hamamatsu (JP)

( * ) Notice: Subject to any disclaimer, the term of this patent is extended or adjusted under 35 U.S.C. 154(b) by 711 days.

(21) Appl. No.: 17/028,386

(22) Filed: Sep. 22, 2020

(65) Prior Publication Data

US 2021/0005173 A1    Jan. 7, 2021

Related U.S. Application Data

(63) Continuation of application No. PCT/JP2019/010595, filed on Mar. 14, 2019.

(30) Foreign Application Priority Data

Mar. 23, 2018  (JP) ................................ 2018-056601

(51) Int. Cl.
*G10H 1/00*   (2006.01)
*G06N 20/00*  (2019.01)
(Continued)

(52) U.S. Cl.
CPC ........... *G10H 1/0008* (2013.01); *G06F 17/18* (2013.01); *G06N 3/08* (2013.01); *G06N 20/00* (2019.01);
(Continued)

(58) Field of Classification Search
CPC ........... G10H 1/0008; G10H 2210/031; G10H 2220/441; G10H 2250/311; G06N 20/00; G06N 3/08; G06V 40/20; G06F 17/18
(Continued)

(56) References Cited

U.S. PATENT DOCUMENTS 8,686,271 B2 *    4/2014  Wang ..................... G10H 1/361
                                              84/600
2010/0189408 A1 *  7/2010  Itoh ..................... H04N 23/661
                                              386/278

(Continued)

FOREIGN PATENT DOCUMENTS

CA   2814869 A1 *  4/2012  ............ A63F 13/211
JP   H11175061 A   7/1999
(Continued)

OTHER PUBLICATIONS

Office Action issued in Japanese Appln. No. 2018-056601 dated Feb. 17, 2022. English translation provided.
(Continued)

*Primary Examiner* — Christina M Schreiber
(74) *Attorney, Agent, or Firm* — ROSSI, KIMMS & McDOWELL LLP

(57) ABSTRACT

An apparatus is provided that accurately estimates a point at which a musical performance is started by a player. The apparatus includes the musical performance analysis unit 32, and the musical performance analysis unit 32 obtains action data that includes a time series of feature data representing actions made by a player during a musical performance for a reference period and estimating a sound-production point based on the action data at an estimated point using a learned model L.

19 Claims, 3 Drawing Sheets

(51) Int. Cl.
 *G06F 17/18* (2006.01)
 *G06N 3/08* (2023.01)
 *G06V 40/20* (2022.01)

(52) U.S. Cl.
 CPC ....... *G06V 40/20* (2022.01); *G10H 2210/031* (2013.01); *G10H 2220/441* (2013.01); *G10H 2250/311* (2013.01)

(58) Field of Classification Search
 USPC .......................................................... 84/600
 See application file for complete search history.

(56) References Cited

U.S. PATENT DOCUMENTS

| | | | |
|---|---|---|---|
| 2013/0239782 A1* | 9/2013 | Yoshihama | G10H 7/00 84/609 |
| 2017/0337910 A1* | 11/2017 | Maezawa | G10H 1/361 |
| 2019/0147837 A1* | 5/2019 | Maezawa | G10H 1/0008 84/609 |
| 2019/0156806 A1* | 5/2019 | Maezawa | G10H 1/40 |
| 2020/0134297 A1* | 4/2020 | Maezawa | G06F 3/012 |
| 2021/0005173 A1* | 1/2021 | Maezawa | G10H 1/0008 |
| 2022/0310047 A1* | 9/2022 | Klapuri | G10H 1/0016 |
| 2022/0383842 A1* | 12/2022 | Kaneko | G10H 1/0025 |
| 2023/0054973 A1* | 2/2023 | Nishioka | G06T 7/292 |

FOREIGN PATENT DOCUMENTS

| | | | | |
|---|---|---|---|---|
| JP | 2007241181 A | | 9/2007 | |
| JP | 2007241181 A | * | 9/2007 | |
| JP | 2011180590 A | * | 9/2011 | ............. G09B 15/02 |
| JP | 2013195645 A | | 9/2013 | |
| JP | 2013195645 A | * | 9/2013 | ........... G10H 1/0008 |
| JP | 2015045731 A | | 3/2015 | |
| JP | 2015079183 A | | 4/2015 | |
| JP | 2017207615 A | * | 11/2017 | ........... G10H 1/0008 |
| JP | 2017207615 A | | 11/2017 | |
| WO | 2006129496 A1 | | 12/2006 | |
| WO | 2018016582 A1 | | 1/2018 | |
| WO | 2018016637 A1 | | 1/2018 | |
| WO | WO-2018016582 A1 | * | 1/2018 | ............... G10G 3/04 |
| WO | WO-2018016637 A1 | * | 1/2018 | ............... G10G 3/04 |
| WO | WO-2019156092 A1 | * | 8/2019 | ............. G06N 3/0445 |
| WO | WO-2021005987 A1 | * | 1/2021 | ............... G06N 3/08 |
| WO | WO-2021059701 A1 | * | 4/2021 | ........... G06N 3/0454 |
| WO | WO-2021193033 A1 | * | 9/2021 | ............. G06N 20/00 |

OTHER PUBLICATIONS

International Search Report issued in Intl. Appln. No. PCT/JP2019/010595 dated May 28, 2019. English translation provided.

Written Opinion issued in Intl. Appln. No. PCT/JP2019/010595 dated May 28, 2019.

* cited by examiner

MUSICAL PERFORMANCE ANALYSIS METHOD AND MUSICAL PERFORMANCE ANALYSIS APPARATUS

CROSS REFERENCE TO RELATED APPLICATIONS

The present application is a continuation application of International Application No. PCT/JP2019/010595, filed Mar. 14, 2019, which claims a priority to Japanese Patent Application No. 2018-056601, filed Mar. 23, 2018. The contents of these applications are incorporated herein by reference in their entirety.

TECHNICAL FIELD

The present disclosure relates to a technology for analyzing a musical performance by a player.

BACKGROUND INFORMATION

Technologies for analyzing actions of a player have been proposed in the prior art. For example, JP H11-175061A (1 hereinafter called "Patent Document 1") discloses a technology for detecting a specific cueing action performed by a player and controlling automatic musical performance of a musical piece so as to be synchronized with this cueing action.

SUMMARY

With the technology in Patent Document 1, the point after a predetermined period has passed from when a cueing action performed by a player was detected is specified as the point when a musical performance is started by the player. However, there is room for improvement from the viewpoint of accurately estimating the point when a musical performance is started by the player.

To solve the foregoing problem, a musical performance analysis method according to a preferable aspect includes obtaining action data that includes a time series of feature data representing actions made by a player during a musical performance for a reference period and estimating a sound-production point based on the action data at an estimated point using a learned model. Also, a musical performance analysis apparatus according to another aspect includes at least one memory storing instructions at least one processor that implements the instructions to execute a plurality of tasks including an obtaining task that obtains action data that includes a time series of feature data representing actions made by a player during a musical performance for a reference period and an estimating task that estimates a sound-production point based on the obtained action data at an estimated point using a learned model.

DESCRIPTION OF EMBODIMENTS

Figure 1:
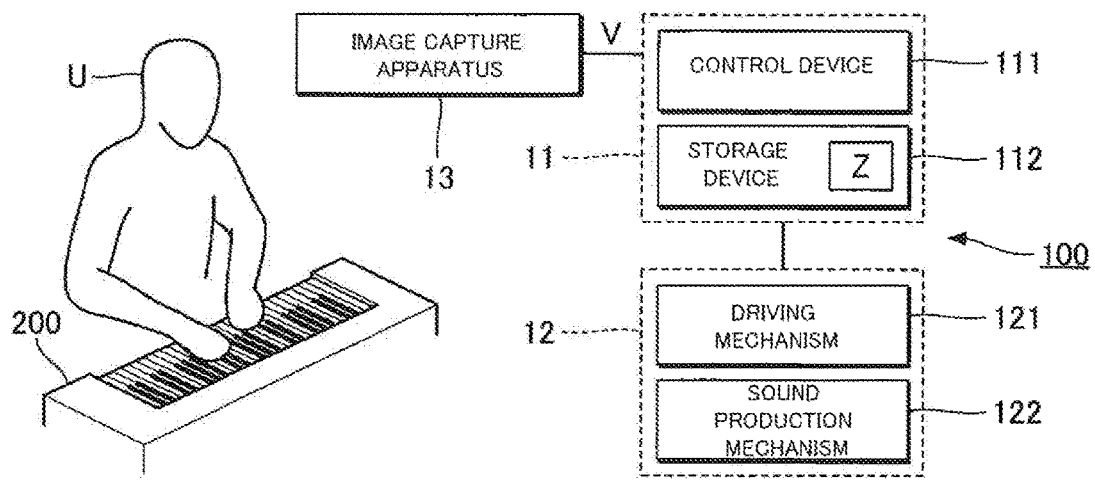
FIG. 1 is a block diagram showing an example of a configuration of a musical performance system.

FIG. 1 is a block diagram showing an example of a configuration of a musical performance system 100. The musical performance system 100 is a system that is installed in a space where a player U is present, such as a concert hall. The player U plays a musical piece using a musical instrument 200, such as a keyboard instrument. The musical performance system 100 performs automatic performance of a musical piece in parallel with the musical performance of this musical piece by the player U. Specifically, the musical performance system 100 analyzes the musical performance by the player U, and performs automatic performance of this musical piece in accordance with the analysis results.

As shown as an example in FIG. 1, the musical performance system 100 includes a musical performance analysis apparatus 11, a musical performance apparatus 12, and an image capture apparatus 13. The musical performance analysis apparatus 11 is a computer system that controls elements of the musical performance system 100. For example, any of various information terminals such as a mobile phone, a smartphone, and a personal computer is preferably used as the musical performance analysis apparatus 11.

The image capture apparatus 13 generates image data V by capturing an image of the player U. The image data V is data that represents a time series of images (i.e. a moving image) of the player U. The image data V can be of any format. The image data V generated by the image capture apparatus 13 is supplied to the musical performance analysis apparatus 11 in a wired or wireless manner. Note that the image capture apparatus 13 can be mounted in the musical performance analysis apparatus 11. Also, for example, a depth camera or a stereo camera that is capable of generating depth information indicating the distance to each part of the player U's body can be used as the image capture apparatus 13. That is to say, the image capture apparatus 13 generates image data V that represents an image of the player U and depth information.

The musical performance apparatus 12 performs automatic performance of a musical piece under the control of the musical performance analysis apparatus 11. Specifically, the musical performance apparatus 12 is a self-playing musical instrument (e.g. self-playing piano) that includes a driving mechanism 121 and a sound production mechanism 122. Similar to a keyboard instrument that is an acaustic musical instrument, for example, the sound production mechanism 122 has a keyboard, and also has a hammer for each key of the keyboard that causes a string (sound-producing body) to produce sound in conjunction with a displacement of the key. The driving mechanism 121 performs automatic performance of a target musical piece by driving the sound production mechanism 122. Automatic performance is realized as a result of the driving mechanism 121 driving the sound production mechanism 122 in accordance with an instruction from the musical performance analysis apparatus 11. Note that the musical performance analysis apparatus 11 can be mounted in the musical performance apparatus 12.

As shown as an example in FIG. 1, the musical performance analysis apparatus 11 is realized by a computer system that includes a control device 111 and a storage device 112. The control device 111 is a processing circuit such as a CPU (Central Processing Unit), and comprehensively controls the elements (the musical performance apparatus 12 and the image capture apparatus 13) that constitute the musical performance system 100. The control device 111 includes one or more processing circuits.

The storage device 112 is a memory that stores programs to be performed by the control device 111 and various data to be used by the control device 111. For example, a known recording medium such as a magnetic recording medium or a semiconductor recording medium, or a combination of different recording mediums is preferable as the storage device 112. The storage device 112 according to this embodiment stores musical piece data Z, which represents a musical piece. Specifically, the musical piece data Z specifies a time series of notes that constitute the musical piece. For example, a file in a format (SMF: Standard MIDI File) that conforms to the MIDI (Musical Instrument Digital Interface) standard is preferable as the musical piece data Z. Note that a storage device 112 (e.g. a cloud storage) that is separate from the musical performance system 100 can be prepared, and the control device 111 can write in and read from the storage device 112 via a communication network. That is to say, the storage device 112 can be omitted from the musical performance analysis apparatus 11.

Figure 2:
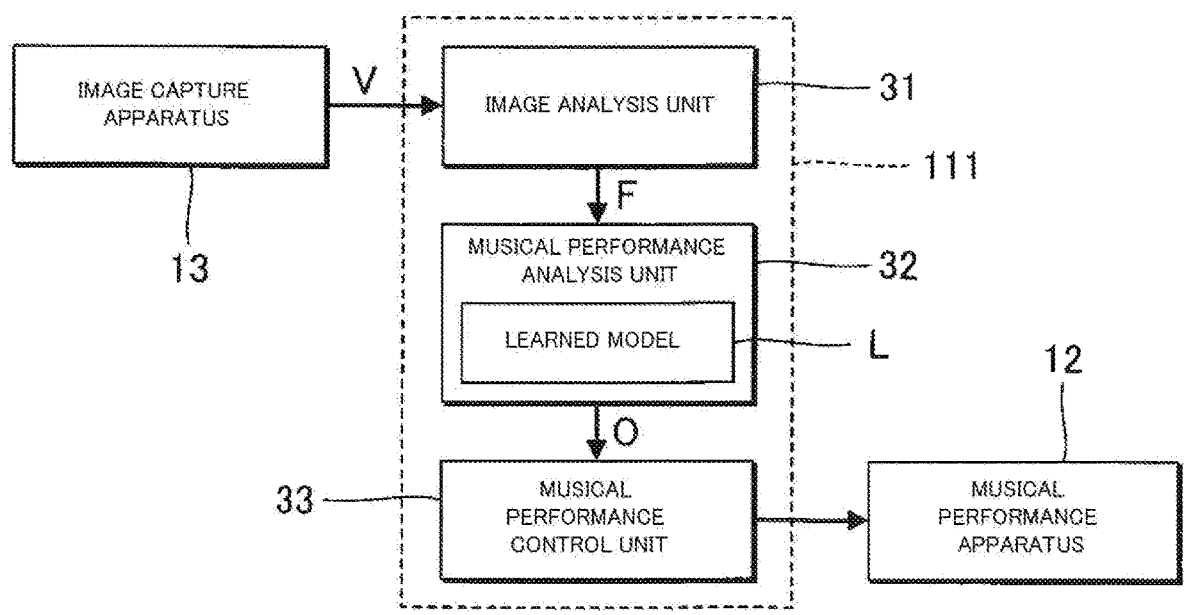
FIG. 2 is a block diagram showing an example of a functional configuration of a control device that is included in the musical performance analysis apparatus.

FIG. 2 is a block diagram showing an example of a functional configuration of the control device 111 that is included in the musical performance analysis apparatus 11. The control device 111 realizes a plurality of functions (image analysis unit 31, musical performance analysis unit 32, and musical performance control unit 33) by executing the programs stored in the storage device 112. Note that the functionality of the control device 111 can be realized by a set (i.e. a system) of a plurality of devices that are configured separately from each other, or some or all of the functions of the control device 111 can be realized by a dedicated electronic circuit. Also, some or all of the functions of the control device 111 can be realized by a computer such as a server device that is located separately from a space such as a concert hall in which the musical performance apparatus 12 and the image capture apparatus 13 are installed.

Figure 3:
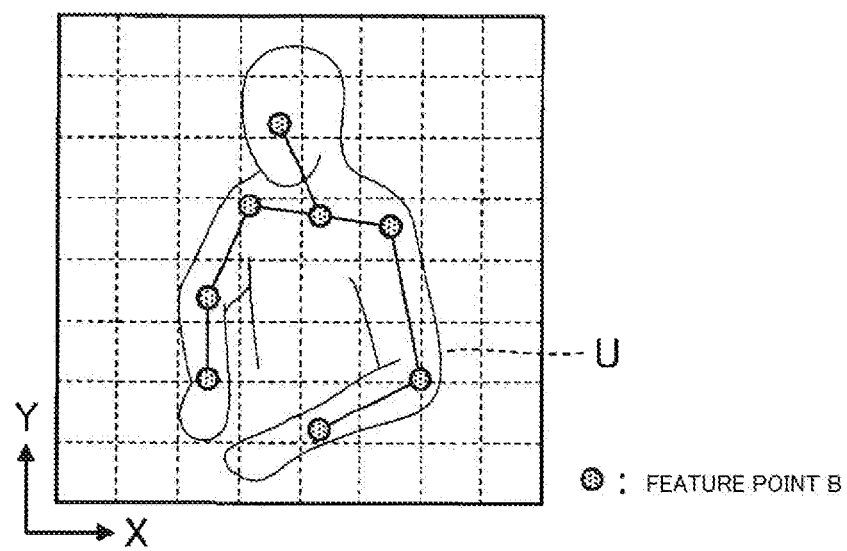
FIG. 3 is a diagram illustrating feature point data.

The image analysis unit 31 generates a time series of feature point data F based on the image data V generated by the image capture apparatus 13 capturing images of the player U. The feature point data F is sequentially generated at predetermined time intervals. FIG. 3 is a diagram illustrating (a set of) the feature point data F at a certain time. The feature point data F in each set is data that represents positions of feature points B on the player U's body. Each of the feature points B is a virtual point that represents a specific portion of the player U's body. For example, feature points B are set for respective portions, such as a joint and a head, of the player U. Each of the feature points B is set within a coordinate plane that includes an X axis and a Y axis that are perpendicular to each other. The feature point data F in each set specifies the X coordinate and the Y coordinate of a plurality of feature points B. As is understood from the above description, the feature point data F in any one set is data that represents the posture or skeletal frame of the player U. The time series of the feature point data F represents a series of actions (i.e. chronological movement of the feature points B) of the player U. Note that the feature point data F that represents the coordinates of the feature points B in a three-dimensional space can be generated by the image analysis unit 31.

The musical performance analysis unit 32 in FIG. 2 analyzes an action of the player U playing a musical piece (hereinafter referred to as a "playing action"). Specifically, the musical performance analysis unit 32 estimates a point when musical sound is produced (hereinafter referred to as a "sound-production point") from the musical performance, based on the time series of the feature point data F that represents the playing action of the player U. That is to say, a sound-production point is predicted based on the playing action of the player U performed immediately before the musical sound is actually produced. For example, a sound-production point is predicted in accordance with a preparatory action performed immediately before the musical instrument 200 is actually operated (hereinafter referred to as a "preparatory action"), such as an action of the player U raising his arm with respect to the keyboard or an action of the player U raising his head or upper body.

Figure 4:
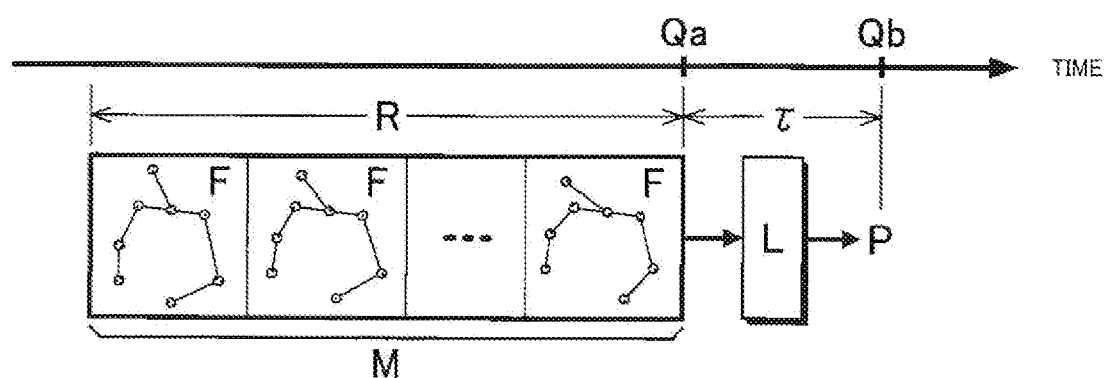
FIG. 4 is a diagram illustrating musical performance analysis processing.
Figure 5:
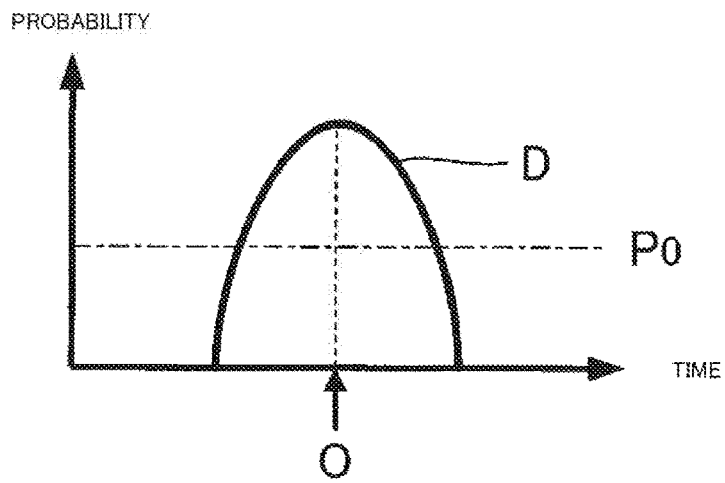
FIG. 5 is a diagram illustrating the relationship between a probability distribution and a sound production point.

FIGS. 4 and 5 are diagrams illustrating processing by which the musical performance analysis unit 32 analyzes the playing action of the player U (hereinafter referred to as "musical performance analysis processing"). As shown as an example in FIG. 4, the musical performance analysis unit 32 calculates the probability P for a plurality of different points (hereinafter referred to as "analysis points") Qa on a time axis. The probability P calculated for one analysis point Qa is an index ($0 \leq P \leq 1$) of the probability that a point (hereinafter referred to as an "estimated point") Qb behind the analysis point Qa corresponds to the sound-production point. The estimated point Qb is a point that is behind the analysis point Qa by a predetermined time τ (e.g. 100 milliseconds). The time τ is longer than an interval $t_{Qa}$ between adjacent analysis points Qa. It is preferable that $\tau \geq 2t_{Qa}$, and it is more preferable that $\tau \geq 3t_{Qa}$.

Since the probability P is calculated for each analysis point Qa on the time axis, a distribution (hereinafter referred to as "probability distribution") D of the probability P on the time axis is specified, as shown as an example in FIG. 5. The musical performance analysis unit estimates a sound-production point O based on the probability distribution D. Specifically, the musical performance analysis unit 32 specifies, as the sound-production point O, the point at which the probability P takes a maximum value within a range in which the probability P exceeds a predetermined threshold P0 in the probability distribution D.

As shown as an example in FIG. 4, the musical performance analysis unit 32 calculates the probability P for the estimated point Qb based on action data M that corresponds to each of the analysis points Qa. The action data M that corresponds to one analysis point Qa on the time axis is constituted by a time series of the feature point data F (of a plurality of sets) at a plurality of times within a period (hereinafter referred to as a "reference period") R that includes this analysis point Qa. The reference period R is a period with a predetermined length (e.g. a second) that ends at the analysis point Qa, for example. As is understood from the above description, the action data M is time-series data that represents a series of playing actions of the player U within the reference period R. The interval $t_{Qa}$ between adjacent analysis points Qa falls below the time length of the reference period R. Accordingly, adjacent reference periods R overlap each other on the time axis. As described above, in this embodiment, the action data M, which is constituted by the time series of the feature point data F within a reference period R is used to estimate the sound-production point O. Accordingly, the sound-production point O can be accurately estimated while giving consideration to a series of playing actions of the player U within the reference period R.

As shown as an example in FIGS. 2 and 4, a learned model L is used when the musical performance analysis unit analyzes a playing action. Specifically, the musical performance analysis unit 32 specifies the probability P by inputting the action data M to the learned model L. The learned model L is a statistical estimation model that is generated through machine learning. For example, any of various mathematical models such as a neural network is employed as the learned model L. For example, a convolutional neural network (CNN) is preferable as the learned model L.

The learned model L is realized by a combination of a program (e.g. a program module that constitutes artificial intelligence software) that causes the control device 111 to perform computation to output the probability P based on the action data M and a plurality of coefficients that are applied to this computation. The plurality of coefficients are set through machine learning (in particular, deep learning) using a large number of training data, and are held in the storage device 112.

Specifically, the plurality of coefficients that define the learned model L are set through machine learning using a plurality of sets of training data in which the action data M and the probability P are associated with each other (i.e. that are pairs of the action data M and the probability P). Specifically, the plurality of coefficients of the learned model L are set such that a difference (i.e. loss function) between the probability P that is output when the action data M included in training data is input to a provisional model and the probability P specified by this training data is reduced (ideally, minimized) for a plurality of sets of training data. A cross-entropy is preferable as the loss function, for example. As is understood from the above description, the learned model L outputs a statistically-valid probability P for unknown action data M, within a relationship that is latent between the action data M and the probability P in the plurality of sets of training data.

Note that action data M in a period in a musical piece in which the preparatory action performed immediately before sound production is likely to be significant (hereinafter referred to as a "preparatory period") is preferable as the action data M to be included in the training data. Examples of the preparatory period can include a period immediately before a point when a musical piece starts playing, or a period immediately before a point when a musical piece resumes playing after a long pause, for example. The action data M in a preparatory period that is manually designated by a person who created training data, of a plurality of sets of action data M generated based on a series of playing actions for the musical piece, is used as the training data.

The above-described learned model L that is generated using the training data has a tendency that the probability P calculated for a reference period R in which the player U's preparatory action is significant takes an especially large value. That is to say, a point when musical sound is produced immediately after a significant preparatory action performed by the player U is likely to be estimated as a sound-production point. On the other hand, a point at which individual musical sound (musical sound that is produced without accompanying a significant preparatory action) in the middle of a series of playing actions within the musical piece is highly likely to be not estimated as a sound-production point.

The musical performance control unit 33 in FIG. is a sequencer that sequentially instructs the musical performance apparatus 12 to play notes that are designated in time-series by the musical piece data Z. Specifically, the musical performance control unit 33 controls the musical performance apparatus 12 such that the musical performance apparatus 12 plays a specific note in the musical piece at the sound-production point O specified by the musical performance analysis unit 32. For example, immediately after the musical piece starts playing, the musical performance apparatus 12 is controlled so as to play the first note of the musical piece at the sound-production point O. Immediately after a long pause in the musical piece, the musical performance apparatus 12 is controlled so as to play the first note after this pause in the musical piece at the sound-production point O. As is understood from the above description, automatic musical performance is started by the musical performance apparatus 12 at the same time as the musical performance is started by the player U.

Figure 6:
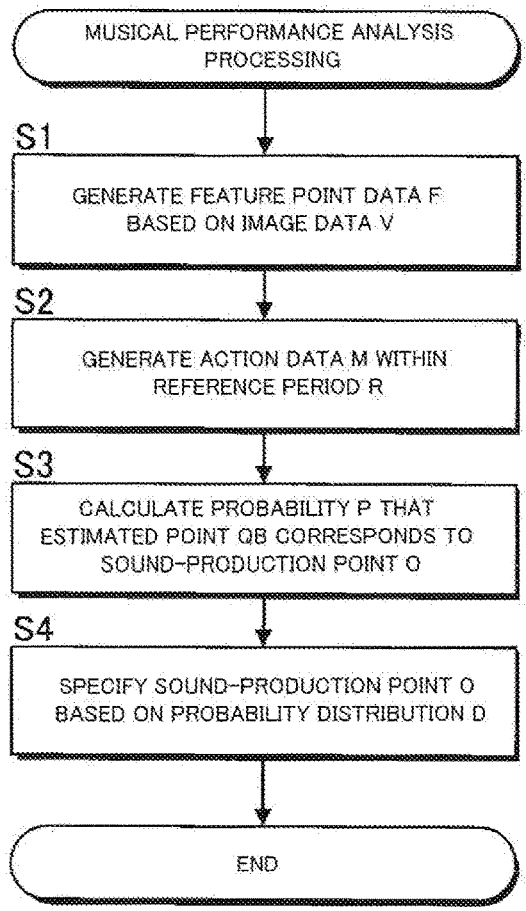
FIG. 6 is a flowchart showing an example of a specific procedure of musical performance analysis processing.

FIG. 6 is a flowchart showing an example of a specific procedure of musical performance analysis processing. The musical performance analysis processing in FIG. 6 is repeated at predetermined intervals, for example. Upon starting the musical performance analysis processing, the image analysis unit 31 generates feature point data F based on image data V generated by the image capture apparatus 13 (S1). The feature point data F is stored in the storage device 112 every time the musical performance analysis processing is performed. That is to say, the time series of the feature point data F is stored in the storage device 112.

The musical performance analysis unit 32 generates, as action data M, a time series of the feature point data F in a reference period R that includes an analysis point Qa, which is the present time (S2). That is to say, a set of feature point data F that covers a predetermined number of sets starting from a base point, which is feature point data F that was generated immediately previously, is selected as the action data M.

The musical performance analysis unit 32 calculates the probability P at which an estimated point Qb that is located behind the analysis point Qa (present time) corresponds to the sound-production point O, by inputting the action data M to the learned model L (S3). If, in the probability distribution D of the probability P by the present time, a maximum point at which the probability P exceeds the threshold P0 is observed, the musical performance analysis unit 32 specifies the maximum point as the sound-production point O (S4). If the probability P falls below the threshold P0, or if no maximum point of the probability P is observed, the musical performance analysis processing ends without specifying the sound-production point O.

As is understood from the above description, according to this embodiment, the sound-production point O is estimated by inputting the action data M, which represents a playing action of the player U, to the learned model L. Accordingly, the sound-production point O deriving from an unknown playing action of the player U can be accurately estimated, compared with a configuration in which the point at which a predetermined time passes from when a specific action of the player U was detected is specified as the sound-production point O. In this embodiment, particularly, the probability P that the estimated point Qb located behind a reference period R is the sound-production point O is calculated by inputting the action data M that represents a playing action in this reference period R to the learned model L. Accordingly, the sound-production point O can be predicted before sound is actually produced from the musical performance. Furthermore, since a time series of the probability P that each estimated point Qb is the sound-production point O is calculated, the aforementioned effect of enabling highly accurate estimation of the sound-production point O is particularly remarkable.

Modifications

Specific modification aspects that are added to the above-described example will be described as examples below.

Any two or more aspects selected from the following example aspects can also be combined, as appropriate, without inconsistency.

(1) In the above-described aspect, automatic musical performance starts at the sound-production point O that is estimated by the musical performance analysis unit 32, but the use of the estimation results obtained by the musical performance analysis unit 32 is not limited to the above example. For example, the estimation results obtained by the musical performance analysis unit 32 can be used in processing for estimating the position (hereinafter referred to as a "playing position") in a musical piece at which the player U is currently playing. For example, the musical performance analysis unit 32 estimates the playing position by analyzing an acoustic signal that represents the sound of a musical instrument 200 being played by the player U. For the estimation of the playing position, a known analysis technique (score alignment), which is disclosed in JP 2015-79183A, for example, is employed. The playing position of the player U can be accurately estimated by giving consideration to a condition that it is highly probable that the sound-production point O estimated by the musical performance analysis unit 32 is the starting point of a specific note in a musical piece. The musical performance control unit 33 can also control automatic musical performance by the musical performance apparatus 12 so as to follow the progress of the playing position estimated by the above method.

(2) In the above-described aspect, a keyboard instrument is taken as an example of the musical instrument 200 played by the player U, but the type of the musical instrument 200 is not limited to the above example. For example, the sound-production point O can also be estimated by analyzing an action of the player U playing a musical instrument 200 such as a brass instrument or a string instrument.

(3) The method for specifying the sound-production point O based on the probability P calculated with the learned model L is not limited to the example in the above-described aspect. For example, the starting point of a temporal range of the probability distribution D in which the probability P exceeds the threshold P0, or a point at which the increase rate of the probability P exceeds a predetermined value can be specified as the sound-production point O.

(4) In the above-described aspect, a self-playing musical instrument such as a self-playing piano is taken as an example of the musical performance apparatus 12, but the musical performance apparatus 12 is not limited to an apparatus that has mechanisms (the driving mechanism 121 and the sound production mechanism 122) similar to those of an acoustic musical instrument. For example, an electronic musical instrument that emits sound instructed by the musical performance control unit 33 can be used as the musical performance apparatus 12. An electronic musical instrument includes, for example, a sound source circuit (e.g. a MIDI sound source) that generates an acoustic signal corresponding to an instruction from the musical performance control unit 33, and a sound-emitting device (e.g. a speaker or a headphone) that emits sound corresponding to the acoustic signal generated by the sound source circuit.

(5) In the above aspect, the musical piece data Z in a format that conforms to the MIDI standard is taken as an example, but the format of the musical piece data Z is not limited to the above example. For example, an acoustic signal that represents the sound of a musical instrument being played (i.e. a sample series that represents a waveform of sound) can alternatively be used as the musical piece data Z. For example, playing positions can be estimated by analyzing an acoustic signal that represents the sound of the musical instrument 200 being played by the player U, and sound represented by the musical piece data Z can be emitted by supplying the sound-emitting device with the time series of samples that correspond to the playing positions in the musical piece data Z (acoustic signal). Note that the technology described in JP 2015-45731A, for example, is preferably used in analysis of temporal correspondence between acoustic signals.

(6) The functionality of the musical performance analysis apparatus 11 can be realized by a computer, such as a server device that communicates with a terminal device that is a mobile phone, a smartphone, or the like. The musical performance analysis apparatus 11 estimates the sound-production point O in accordance with image data V received from the terminal device, and transmits an automatic performance instruction corresponding to the estimation result to the terminal device. Note that, the image analysis unit 31 is omitted from the musical performance analysis apparatus 11 in the case of a configuration in which the feature point data F is transmitted from the terminal device, and the musical performance control unit 33 is omitted from the musical performance analysis apparatus 11 in the case of a configuration in which the terminal device includes the musical performance control unit 33.

(7) The functionality of the musical performance analysis apparatus 11 according to the above-described aspect is realized by cooperation of a computer (e.g. the control device 111) and a program. The program according to the above-described aspect is provided in a state of being stored in a computer-readable recording medium, and is installed in a computer. The recording medium is a non-transitory recording medium, for example, and is preferably an optical recording medium (optical disk) such as a CD-ROM, but can also include a recording medium in any known format, such as a semiconductor recording medium or a magnetic recording medium. Note that a non-transitory recording medium can include any kind of recording medium excluding a transitory, propagating signal, and does not exclude a volatile recording medium. Also, the program can be distributed to a computer via a communication network.

(8) The artificial intelligence software for realizing the learned model L is not necessarily executed by a CPU. For example, the artificial intelligence software can be executed by a neural network processing circuit such as a tensor processing unit or a neural engine, or a DSP (Digital Signal Processor) dedicated for artificial intelligence. A plurality of types of processing circuits selected from the above example can cooperate to execute the artificial intelligence software.

The invention claimed is:

1. A musical performance analysis method realized by a computer, the method comprising:
   inputting into a learned model, for each of a plurality of analysis points on a time axis, action data representing performance movement made by a performer during a reference period that includes the respective analysis point; and
   outputting from the learned model, a probability that an estimated time point that follows the reference period corresponds to a sound-production time point where sound starts following an action with the respective reference period.

2. The musical performance analysis method according to claim 1, further comprising estimating the sound-production point from a time series of a plurality of probabilities output from the learned model.

3. The musical performance analysis method according to claim 2, wherein the estimating of the sound-production point estimates the sound-production point based on a distribution of the plurality of probabilities, output from the learned model, corresponding to the plurality of respective analysis points.

4. The musical performance analysis method according to claim 2, further comprising:
generating a time series of feature data based on image data obtained by capturing a time sequence of images of a player,
wherein the time series of feature data represent, for each image of the captured time sequence of images of the player, features points of the player's body.

5. The musical performance analysis method according to claim 2, wherein the sound-production point is a point at which a player starts sound production of a musical performance.

6. The musical performance analysis method according to claim 1, further comprising:
generating a time series of feature data based on image data obtained by capturing a time sequence of images of a player,
wherein the time series of feature data represent, for each image of the captured time sequence of images of the player, features points of the player's body.

7. The musical performance analysis method according to claim 1, wherein the sound-production point is a point at which a player starts sound production of a musical performance.

8. The musical performance analysis method according to claim 1, wherein the action data comprises a time series of feature point data in the reference period that includes the respective analysis point.

9. A musical performance analysis apparatus comprising:
at least one memory storing instructions;
at least one processor that implements the instructions to:
input into a learned model, for each of a plurality of analysis points on a time axis, action data representing performance movement made by a performer during a reference period that includes the respective analysis point; and
output from the learned model, a probability that an estimated time point that follows the reference period corresponds to a sound-production time point where sound starts following an action with the respective reference period.

10. The musical performance analysis apparatus according to claim 9, wherein the at least one processor implements the instructions to estimate the sound-production point from a time series of a plurality of probabilities output from the learned model.

11. The musical performance analysis apparatus according to claim 10, wherein the at least one processor estimates the sound-production point based on a distribution of the plurality of probabilities, output from the learned model, corresponding to the plurality of respective analysis points.

12. The musical performance analysis apparatus according to claim 10, wherein:
the at least one processor implements the instructions to generate a time series of feature data based on image data obtained by capturing a time sequence of images of a player, and
the time series of feature data represent, for each image of the captured time sequence of images of the player, features points of the player's body.

13. The musical performance analysis apparatus according to claim 10, wherein the sound-production point is a point at which a player starts sound production of a musical performance.

14. The musical performance analysis apparatus according to claim 9, wherein:
the at least one processor implements the instructions to generate a time series of feature data based on image data obtained by capturing a time sequence of images of a player, and
the time series of feature data represent, for each image of the captured time sequence of images of the player, features points of the player's body.

15. The musical performance analysis apparatus according to claim 9, wherein the sound-production point is a point at which a player starts sound production of a musical performance.

16. The musical performance analysis apparatus according to claim 9, wherein the at least one processor implements the instructions to start an automatic musical performance at the estimated-sound production point.

17. The musical performance analysis apparatus according to claim 9, wherein the action data comprises a time series of feature point data in the reference period that includes the respective analysis point.

18. A non-transitory computer readable medium storing a program executable by a computer to execute a method comprising:
inputting into a learned model, for each of a plurality of analysis points on a time axis, action data representing performance movement made by a performer during a reference period that includes the respective analysis point; and
outputting from the learned model, a probability that an estimated time point that follows the reference period corresponds to a sound-production time point where sound starts following an action with the respective reference period
obtaining action data that includes a time series of feature data representing actions made by a player during a musical performance for a reference period; and
estimating a sound-production point based on the action data at an estimated point using a learned model.

19. The non-transitory computer readable medium according to claim 18, wherein the action data comprises a time series of feature point data in the reference period that includes the respective analysis point.

* * * * *